United States Patent
Gibson et al.

(10) Patent No.: US 9,707,963 B2
(45) Date of Patent: Jul. 18, 2017

(54) SYSTEMS AND METHODS FOR OPERATING A VEHICLE WITH A MANUAL SHIFT TRANSMISSION

(71) Applicant: Ford Global Technologies, LLC, Dearborn, MI (US)

(72) Inventors: Alexander O'Connor Gibson, Ann Arbor, MI (US); Matthew John Shelton, Grosse Ile, MI (US); Michael Glenn Fodor, Dearborn, MI (US); Bradley Dean Riedle, Northville, MI (US); Hong Jiang, Birmingham, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/878,979

(22) Filed: Oct. 8, 2015

(65) Prior Publication Data

US 2017/0101098 A1     Apr. 13, 2017

(51) Int. Cl.
| | |
|---|---|
| *B60W 30/18* | (2012.01) |
| *B60W 10/02* | (2006.01) |
| *B60W 10/06* | (2006.01) |
| *F16D 48/06* | (2006.01) |

(52) U.S. Cl.
CPC ............ *B60W 30/18* (2013.01); *B60W 10/02* (2013.01); *B60W 10/06* (2013.01); *F16D 48/06* (2013.01); *B60W 2510/0275* (2013.01); *B60W 2510/1005* (2013.01); *B60W 2540/12* (2013.01); *B60W 2540/14* (2013.01); *B60W 2710/021* (2013.01); *B60W 2710/0644* (2013.01)

(58) Field of Classification Search
CPC .................................................... F16D 48/06
See application file for complete search history.

(56) References Cited

U.S. PATENT DOCUMENTS

| | | | |
|---|---|---|---|
| 9,074,571 B1 | 7/2015 | Malone et al. | |
| 2003/0078137 A1* | 4/2003 | Shigyo | F16D 48/06 477/74 |
| 2012/0270701 A1 | 10/2012 | Christen et al. | |
| 2013/0297161 A1* | 11/2013 | Gibson | B60W 20/00 701/54 |

* cited by examiner

*Primary Examiner* — Derek D Knight
(74) *Attorney, Agent, or Firm* — Julia Voutyras; McCoy Russell LLP (57) ABSTRACT

Systems and methods for operating a vehicle that includes a manual transmission are presented. In one example, a clutch actuator that responds to a position of a manual operated clutch pedal is adjusted to operate a clutch so that the vehicle may be stopped, while the engine is running or not, without the driver applying the clutch pedal.

18 Claims, 8 Drawing Sheets

SYSTEMS AND METHODS FOR OPERATING A VEHICLE WITH A MANUAL SHIFT TRANSMISSION

FIELD

The present description relates to systems and methods for operating a vehicle with a manual shift transmission coupled to an engine. The methods and system may be particularly useful for vehicles that may be driven in heavy traffic conditions.

BACKGROUND AND SUMMARY

A manual transmission may be shifted when a driver depresses a clutch pedal and adjusts a position of a manual shift lever. The clutch pedal opens a single clutch that disconnects each transmission gear from an engine. The manual transmission includes a shift lever to individual engage each of the transmission's gears respectively and the shifter is moved by the vehicle's driver to a unique position for each gear engaged. If a driver of the vehicle encounters heavy traffic conditions, the driver may have to repeatedly apply and release the clutch based on gradual traffic movement. The driver may soon grow weary of applying and releasing the clutch to keep up with traffic movement. The same is true if the manual transmission vehicle is a start/stop vehicle that automatically stops engine rotation in response to a depressed or open clutch and driving conditions where a driver does not specifically requesting engine stop via a dedicated engine stop input.

The inventors herein have recognized the above-mentioned disadvantages and have developed a method for operating a vehicle, comprising: automatically opening a clutch of a manual transmission in response to a clutch pedal for operating the clutch not being applied and a speed being less than a threshold while the manual transmission is engaged in a gear, in a first operating mode; and opening the clutch in response to a driver applying the clutch pedal in a second operating mode.

By automatically opening and closing a clutch of a manual transmission, it may be possible to operate a vehicle in congested traffic without the driver having to continually apply and release a clutch pedal. For example, at low vehicle speeds, the clutch may be opened and closed via an electrical actuator so that the vehicle may stop while the engine continues to combust air and fuel without the driver having to apply and release the clutch to stop and accelerate the vehicle. Further, the clutch may be operated in a way that allows the vehicle's engine to stop rotating when the vehicle is stopped so that fuel consumption may be reduced. During other driving conditions, the clutch may be opened and closed responsive to a clutch pedal position so that the driver exercises transmission shifting according to the driver's desire and actions.

The present description may provide several advantages. In particular, the approach may reduce driver fatigue. Further, the approach may improve vehicle emissions by improving vehicle launching. Additionally, the approach may decrease a number of procedural steps to enter automatic engine stopping and starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
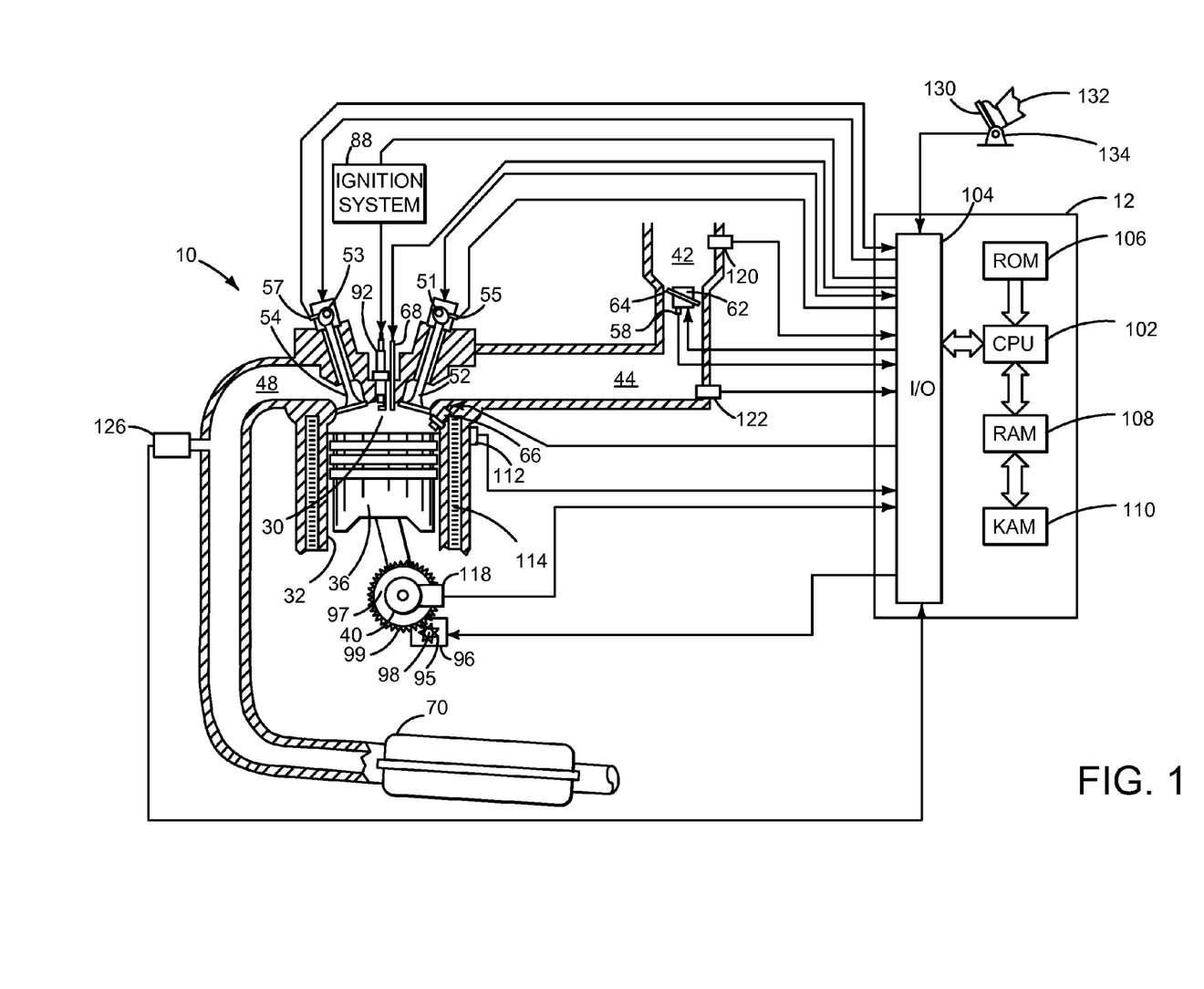
FIG. 1 is a schematic diagram of an engine.
Figure 2:
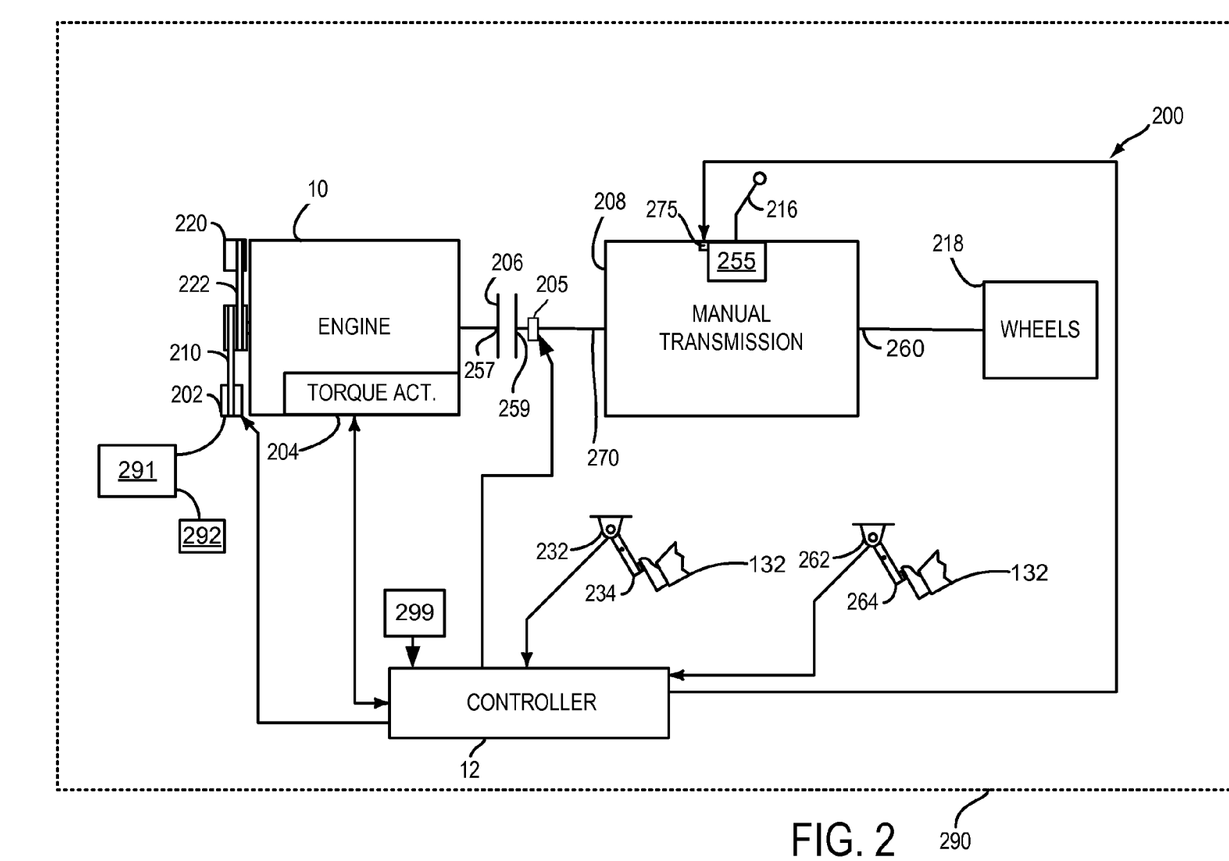
FIG. 2 is shows an example vehicle driveline configuration.

The present description is related to operating a vehicle that includes an internal combustion engine and a manual transmission. The engine may be configured as shown in FIG. 1. The engine may be mechanically coupled to driveline components to form a driveline as shown in FIG. 2. A single clutch that allows a plurality of gears to be selectively and engaged and disengaged while a vehicle is moving or stationary may be operated as is shown in FIGS. 3-7. The method described in FIG. 8 may be included in the systems of FIGS. 1 and 2 to operate the clutch and engine as is shown in FIGS. 3-7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Fuel injector 66 deliver liquid fuel in proportion to pulse widths from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A driver 132 inputs a driver demand torque to controller 12 via accelerator pedal 130 and accelerator pedal position sensor 134. The driver demand torque may be a function of vehicle speed and accelerator pedal position.

Controller 12 is shown in FIG. 1 as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. Engine 10 may be started with an engine starting system shown in FIG. 1. Further, engine 10 may generate or adjust torque via torque actuator 204, such as a fuel injector, cam, throttle, etc. Engine 10 may provide torque to alternator 202 via belt 210 to provide electrical power to electrical devices. Thus, alternator 202 selectively applies a negative torque to engine 10. Further, electrical charge is supplied by alternator 202 to electric energy storage device (e.g., battery) 291. Electric energy storage device supplies charge to ancillary electrical devices 292 (e.g., window defroster, radio, etc). Device 220 also selectively applies a negative torque to engine 10 via belt 222. Device 220 may be an air conditioner compressor, vacuum pump, or other torque consuming device.

An engine output torque may be transmitted to clutch 206. Clutch 206 includes an input side 257 and an output side 259. Clutch 206 selectively engages flywheel 97 to transfer engine torque to transmission input shaft 270. An actuator 205 moves clutch plates in a longitudinal direction to engage or disengage transmission input shaft 270 to the engine flywheel 97. Clutch actuator 205 may be comprised of electrical, hydraulic, or a combination of electrical and hydraulic components. In one mode, a position of actuator 205 is adjusted to move proportionately with a positon of clutch pedal 234 so that clutch 206 may be applied and released. A position of clutch pedal 234 is relayed to controller via sensor 232. Clutch pedal 234 is in a base position when driver 132 is not touching clutch pedal 234. Driver 132 applies force to move clutch pedal from its base position so that clutch 206 may be opened when clutch pedal 234 is applied. Clutch 206 may be closed when clutch pedal 234 is released. Clutch actuator 205 may also open and close independent from the position of clutch pedal 234 when clutch 206 is being operated automatically.

Manually operated transmission 208 includes gears (e.g., gears 1-6) 255. The gears 255 are fixed ratio gears that provide different ratios between transmission input shaft 270 and output shaft 260. Gears 255 may be manually engaged and disengaged by opening clutch 206 and only a driver 132 moving manual gear selector 216 to individually engage gears 255. Thus, gears of manual transmission 208 are not automatically changed or changed via non-human actuators such as solenoids. Closing clutch 206 transfers power from engine 10 to wheels 218 when one of gears 255 is engaged via manual gear selector or shifter 216. Gear positions are reported to controller 12 via gear position sensors 275. Output shaft 260 links manual transmission 208 to wheels 218. In some examples, an axle and gears may be positioned between manual transmission 208 and wheels 216.

Controller 12 may be configured to receive inputs from engine 10, as shown in more detail in FIG. 1, and accordingly control a torque output of the engine and/or operation of the alternator 202 and device 222. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. Controller 12 may also receive input from a driver and provide status and data to a driver via a machine/human interface 299. The machine/human interface 299 may be a keyboard or touch screen device.

Thus, the method of FIGS. 1 and 2 provides for a vehicle system, comprising: an engine; a manual transmission coupled to the engine, the manual transmission including a clutch that moves responsive to a clutch pedal; and a controller including executable instructions stored in non-transitory memory for automatically opening a clutch of a manual transmission in response to the clutch pedal not being applied and a speed being less than a threshold while the manual transmission is engaged in a gear, and further instructions to automatically start closing the clutch in response to a brake pedal being at least partially released. The vehicle system includes where the brake pedal is at least partially released when the brake pedal moves closer to its base position, and where the base position where the brake pedal reverts to when no force is applied to the brake pedal.

In some examples, the vehicle system further comprising additional instructions to adjust a rate of increasing a torque capacity of the clutch in response to vehicle speed. The vehicle system further comprises additional instructions to adjust the rate of increasing a torque capacity of the clutch in response to road grade. The vehicle system further comprises additional instructions to increase a torque capacity of the engine via increasing engine speed in response to an estimate of clutch torque capacity to launch the vehicle. The vehicle system includes where the engine torque capacity is increased via increasing engine speed. The vehicle system further comprises an electrical clutch actuator, the electrical clutch actuator responsive to a position of the clutch pedal.

Figure 3:
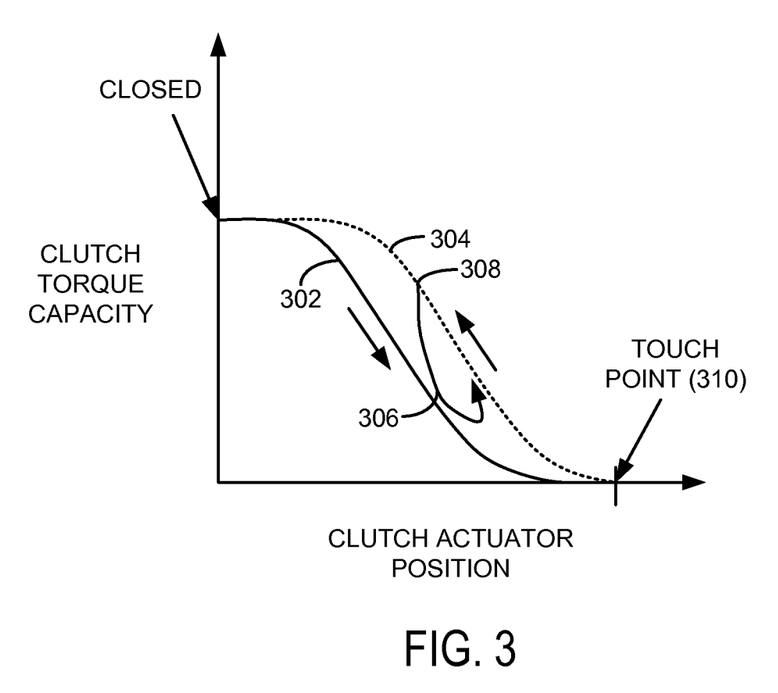
FIG. 3 shows torque capacity of a clutch as a function of direction of clutch movement and clutch actuator displacement.

Referring now to FIG. 3, a simulated example clutch torque capacity (e.g., an amount of torque can transfer at particular clutch actuator position) versus clutch actuator position plot is shown. The vertical axis represents clutch torque capacity and the horizontal axis represents clutch actuator position. The clutch torque capacity increases in the direction of the vertical axis arrow. The horizontal axis represents clutch actuator position. The clutch actuator is in a base position at the intersection of the vertical and horizontal axes where the clutch's torque capacity is greatest. The clutch actuator position being away from the base position increases in the direction of the horizontal axis arrow. The clutch's friction plate is in contact with the engine flywheel from the vertical axis to the touch point 310. When the clutch actuator position is to the right of touch point 310, the clutch's friction plate is not in contact with the engine flywheel.

The plot includes a first curve 302 and a second curve 304. First curve (solid line) 302 represents clutch torque capacity when the clutch is being opened or is unloading. Second curve (dashed line) 304 represents clutch torque capacity when the clutch is being closed or loading. Thus, it may be observed that the clutch's torque capacity versus clutch actuator position is different when the clutch is being loaded as compared to when the clutch is being unloaded.

The plot also includes an arrow 306 that represents a clutch torque trajectory for an example clutch torque capacity loading and unloading sequence where the driver changes direction of the clutch pedal from letting out or engaging the clutch to releasing the clutch. It may be observed that the clutch's torque capacity changes very quickly once the driver reverses the direction of the clutch at 308. The quick change in the clutch's torque capacity may degrade vehicle drivability. The clutch control methods shown in FIGS. 4-7 may reduce the possibility of similar changes in clutch torque capacity when the clutch is operated automatically.

Figure 4:
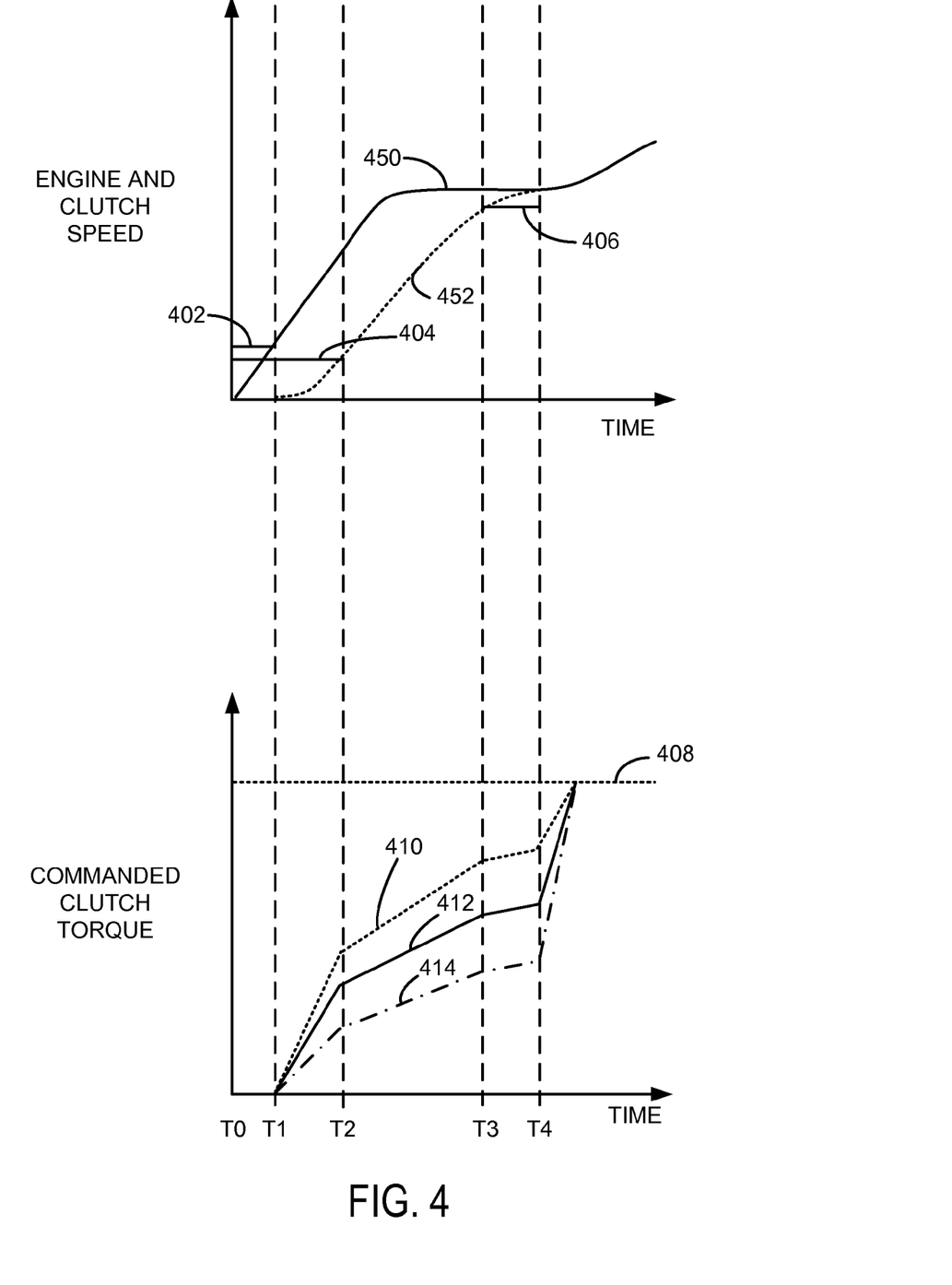
FIG. 4 shows a first example of engine and clutch speed with respect to command clutch torque capacity.

Referring now to FIG. 4, a first example sequence for launching a vehicle that includes a manual transmission with a clutch actuator is shown. The sequence shown in FIG. 4 may be provided via the method of FIG. 8 in the system of FIGS. 1 and 2. The sequence of FIG. 4 is representative of a vehicle launch where a driver does not operate a clutch pedal after a vehicle is stopped and an engine is automatically stopped (e.g., the engine is stopped without a driver operating a device that has a sole purpose of starting and stopping the engine, such as an ignition switch) in response to vehicle operating conditions. The clutch is opened by the clutch actuator when the vehicle speed is less than a threshold or when engine is less than a threshold. The engine and vehicle may be automatically stopped in response to a driver applying a brake and driver demand torque less than a threshold.

The first plot from the top of FIG. 4 is a plot of engine speed and clutch speed versus time. The vertical axis represents engine speed and clutch speed and speed increases in the direction of the vertical axis arrow. The horizontal axis represents time and time increases from the left side of the plot to the right side of the plot. Solid line curve 450 represents engine speed. Dashed line curve 452 represents clutch output speed (e.g., speed on an opposite side of the clutch than the side of the clutch the engine is on). Engine speed at the level of line 402 is a threshold engine starting speed. Clutch speed at the level of line 404 is a minimum clutch output speed. The difference between engine speed and the clutch speed shown at 406 is a clutch slip threshold.

The second plot from the top of FIG. 4 is a plot of commanded clutch torque capacity versus time. The vertical axis represents clutch torque capacity (e.g., an amount of torque a clutch is capable of transferring) and clutch torque capacity increases in the direction of the vertical axis arrow. The horizontal axis represents time and time increases from the left side of the plot to the right side of the plot. Dashed line 408 represents a maximum clutch torque capacity. Solid line 412 represents a commanded clutch torque capacity for a vehicle operated on a road with zero grade. Dashed line 410 represents a commanded clutch torque capacity for the same vehicle operated on a road with a non-zero positive (e.g., uphill) grade, all other conditions excepting grade being equal. Dot dashed line 414 represents a commanded clutch torque capacity for a vehicle operated on a road with a non-zero negative (e.g., downhill) grade, all other conditions excepting grade being equal. The difference between the different torque levels is based on the equation:

$$T\text{grade} = R_r M g \sin(\theta)$$

where Tgrade is the torque adjustment for road grade, $R_r$ is the wheel rolling radius, M is vehicle mass, g is gravitational constant, and e is the road grade in degrees.

The first plot and the second plot are based on data from the same time. Additionally, the plots are time aligned to show the relationships between variables.

At time T0, the engine is automatically started in response to a driver releasing a brake pedal or other condition (not shown). The engine is started via engaging a starter and supplying spark and fuel to the engine, or alternatively, the engine may be started via a motor in the driveline. Engine speed increases in response to combustion within the engine. The clutch is in an open state.

At time T1, the commanded clutch torque capacity is increased at a first rate in response to engine speed being greater than a threshold engine starting speed. In one example, the threshold engine starting speed is a speed greater than cranking speed (e.g., a speed the engine starter rotates the engine before combustion in the engine) and less than a lowest engine idle speed (e.g., a speed for low torque conditions where combustion stability is greater than a threshold). The clutch output speed begins to increase in response to the increased commanded clutch torque capacity.

At time T2, the commanded clutch torque capacity is increased at a second rate, lower than the first rate, in response to clutch speed being greater than a minimum clutch output speed threshold. The clutch output speed continues to increase in response to the increased commanded clutch torque capacity and engine speed.

At time T3, the commanded clutch torque capacity is increased at a third rate, lower than the second rate, in response to clutch slip being less than a threshold. Clutch slip is a speed difference between engine speed (e.g., 450) and clutch output speed (e.g., 452) being greater than a threshold engine starting speed. The clutch output speed continues to increase in response to the commanded clutch capacity and engine speed.

At time T4, the commanded clutch torque capacity is increased at a maximum rate in response to clutch slip speed being zero. By rapidly increasing the commanded clutch torque capacity, clutch slip may be avoided, even if engine torque increases.

Thus, to launch the vehicle in an equivalent way, a commanded clutch torque capacity may be increased for the vehicle moving uphill and decreased for the vehicle moving downhill. The commanded clutch torque capacity is less than the maximum clutch torque capacity at all times in the sequence. Adjusting the commanded clutch torque capacity in this way may reduce the possibility of the controller increasing clutch torque capacity and then reducing clutch torque capacity to reduce the possibility of engine stall during a vehicle launch where the engine was initially stopped.

Figure 5:
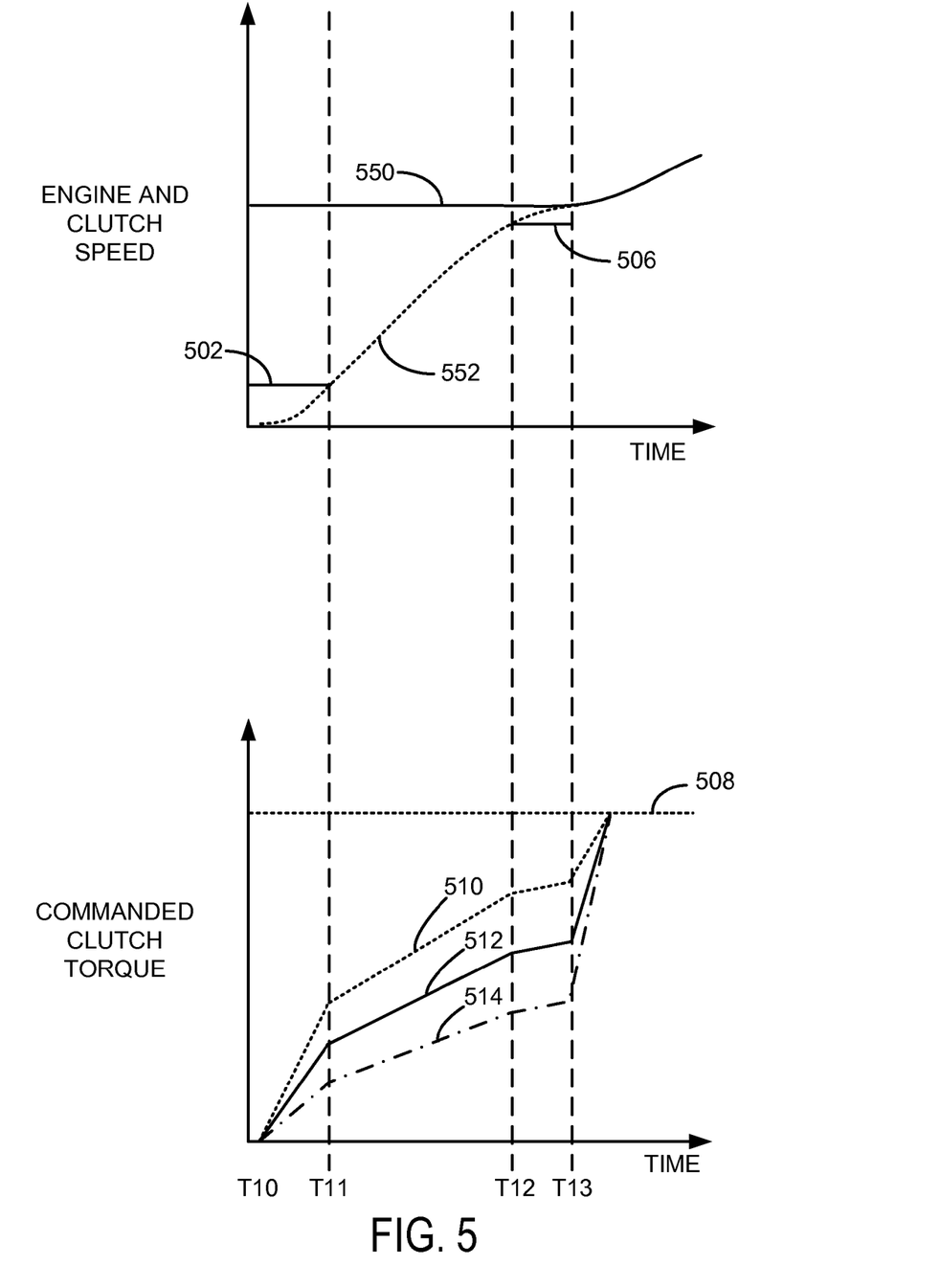
FIG. 5 shows a second example of engine and clutch speed with respect to command clutch torque capacity.

Referring now to FIG. 5, a second example sequence for launching a vehicle that includes a manual transmission with a clutch actuator is shown. The sequence shown in FIG. 5 may be provided via the method of FIG. 8 in the system of FIGS. 1 and 2. The sequence of FIG. 5 is representative of a vehicle launch where the driver does not operate a clutch pedal after a vehicle is stopped while the vehicle's engine continues to rotate and combust air and fuel. The clutch is opened by the clutch actuator when the vehicle is stopped. The vehicle may be automatically stopped in response to a driver applying a brake and driver demand torque less than a threshold.

The first plot from the top of FIG. 5 is a plot of engine speed and clutch speed versus time. The vertical axis represents engine speed and clutch speed and speed increases in the direction of the vertical axis arrow. The horizontal axis represents time and time increases from the left side of the plot to the right side of the plot. Solid line curve 550 represents engine speed. Dashed line curve 552 represents clutch output speed (e.g., speed on an opposite side of the clutch than the side of the clutch the engine is on). Clutch speed at the level of line 502 is a minimum clutch output speed. The difference between engine speed at time T12 and the clutch speed shown at 506 and time T12 is a clutch slip threshold.

The second plot from the top of FIG. 5 is a plot of commanded clutch torque capacity versus time. The vertical axis represents clutch torque capacity (e.g., an amount of torque a clutch is capable of transferring) and clutch torque capacity increases in the direction of the vertical axis arrow. The horizontal axis represents time and time increases from the left side of the plot to the right side of the plot. Dashed line 508 represents a maximum clutch torque capacity. Solid line 512 represents a commanded clutch torque capacity for a vehicle operated on a road with zero grade. Dashed line 510 represents a commanded clutch torque capacity for the same vehicle operated on a road with a non-zero positive (e.g., uphill) grade, all other conditions excepting grade being equal. Dot dashed line 514 represents a commanded clutch torque capacity for a vehicle operated on a road with a non-zero negative (e.g., downhill) grade, all other conditions excepting grade being equal.

The first plot and the second plot are based on data from the same time. Additionally, the plots are time aligned to show the relationships between variables.

At time T10, the engine is operating at idle speed and the driver releases a brake pedal or other condition (not shown). The commanded clutch torque capacity is increased at a first rate in response to the brake pedal being released and clutch output speed being less than a minimum clutch output speed. The clutch output speed begins to increase in response to the increased commanded clutch torque capacity.

At time T11, the commanded clutch torque capacity is increased at a second rate, lower than the first rate, in response to clutch speed being greater than a minimum clutch output speed threshold. The clutch output speed continues to increase in response to the increased commanded clutch torque capacity and engine speed.

At time T12, the commanded clutch torque capacity is increased at a third rate, lower than the second rate, in response to clutch slip being less than a threshold. Clutch slip is a speed difference between engine speed (e.g., 550) and clutch output speed (e.g., 552) being greater than a threshold engine starting speed. The clutch output speed continues to increase in response to the commanded clutch capacity and engine speed.

At time T13, the commanded clutch torque capacity is increased at a maximum rate in response to clutch slip speed being zero. By rapidly increasing the commanded clutch torque capacity, clutch slip may be avoided, even if engine torque increases.

Thus, to launch the vehicle in an equivalent way when the engine is idling, a commanded clutch torque capacity may be increased for the vehicle moving uphill and decreased for the vehicle moving downhill. The commanded clutch torque capacity is less than the maximum clutch torque capacity at all times in the sequence. Adjusting the commanded clutch torque capacity in this way may reduce the possibility of the controller increasing clutch torque capacity and then reducing clutch torque capacity to reduce the possibility of engine stall during a vehicle launch where the engine was initially stopped.

Figure 6:
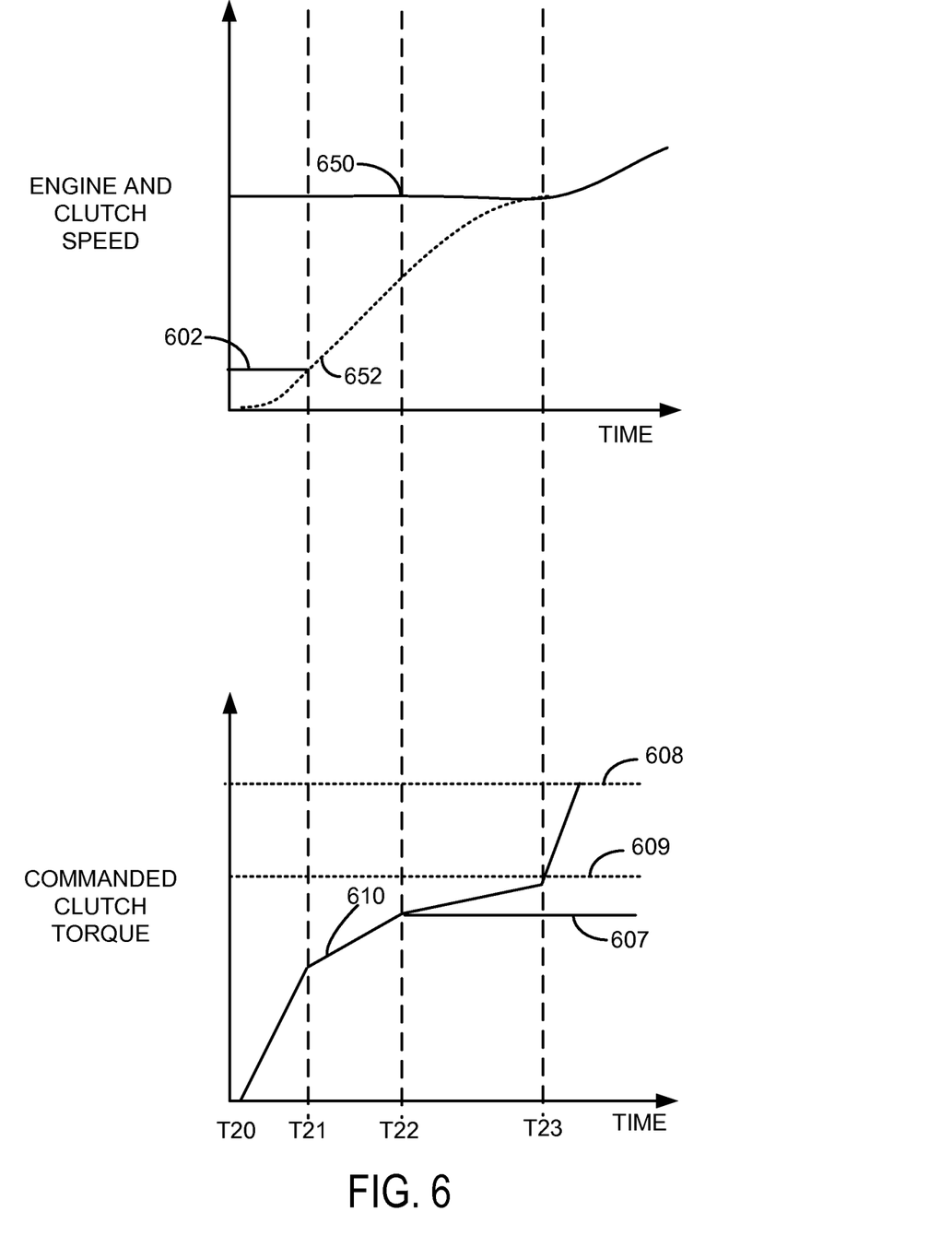
FIG. 6 shows a second example of engine and clutch speed with respect to command clutch torque capacity.

Referring now to FIG. 6, a third example sequence for launching a vehicle that includes a manual transmission with a clutch actuator is shown. The sequence shown in FIG. 6 may be provided via the method of FIG. 8 in the system of FIGS. 1 and 2. The sequence of FIG. 6 is representative of a vehicle launch where the driver does not operate a clutch pedal after a vehicle is stopped while the vehicle's engine continues to rotate and combust air and fuel and where maximum engine torque is less than maximum clutch torque capacity. The maximum engine torque capacity may be less than maximum clutch torque capacity if the vehicle is being launched (e.g., accelerated from zero speed) with the transmission engaged in a gear higher than $1^{st}$ gear (e.g., $2^{nd}$ gear). The maximum engine torque may be limited due to pre-ignition, low combustion stability, and/or knock. The clutch is opened by the clutch actuator when the vehicle is stopped. The vehicle may be automatically stopped in response to a driver applying a brake and driver demand torque less than a threshold.

The first plot from the top of FIG. 6 is a plot of engine speed and clutch speed versus time. The vertical axis represents engine speed and clutch speed and speed increases in the direction of the vertical axis arrow. The horizontal axis represents time and time increases from the left side of the plot to the right side of the plot. Solid line curve 650 represents engine speed. Dashed line curve 652 represents clutch output speed (e.g., speed on an opposite side of the clutch than the side of the clutch the engine is on). Clutch speed at the level of line 602 is a minimum clutch output speed.

The second plot from the top of FIG. 6 is a plot of commanded clutch torque capacity versus time. The vertical axis represents clutch torque capacity (e.g., an amount of torque a clutch is capable of transferring) and clutch torque capacity increases in the direction of the vertical axis arrow. The horizontal axis represents time and time increases from the left side of the plot to the right side of the plot. Dashed line 608 represents a maximum clutch torque capacity. Dashed line 609 represents a maximum engine torque capacity at the present engine speed. Solid line 610 represents a commanded clutch torque capacity for a vehicle operated on a road with zero grade.

The first plot and the second plot are based on data from the same time. Additionally, the plots are time aligned to show the relationships between variables.

At time T20, the engine is operating at idle speed and the driver releases a brake pedal or other condition (not shown). The commanded clutch torque capacity is increased at a first rate in response to the brake pedal being released and clutch output speed being less than a minimum clutch output speed. The clutch output speed begins to increase in response to the increased commanded clutch torque capacity.

At time T21, the commanded clutch torque capacity is increased at a second rate, lower than the first rate, in response to clutch speed being greater than a minimum clutch output speed threshold. The clutch output speed continues to increase in response to the increased commanded clutch torque capacity and engine speed.

At time T22, the commanded clutch torque capacity is increased at a third rate, lower than the second rate, in response to commanded clutch torque capacity being within a threshold torque of the maximum engine torque. The distance between lines 609 and 607 represents the threshold torque amount. The clutch output speed continues to increase in response to the commanded clutch capacity and engine speed.

At time T23, the commanded clutch torque capacity is increased at a maximum rate in response to clutch slip speed being zero. By rapidly increasing the commanded clutch torque capacity, clutch slip may be avoided, even if engine torque increases. Thus, to launch the vehicle in an equivalent way when the engine is idling and maximum engine torque is limited, the commanded clutch torque capacity may be based on a threshold torque that is less than the maximum engine torque so that engine speed is not reduced and so that the possibility of engine stalling may be reduced.

Figure 7:
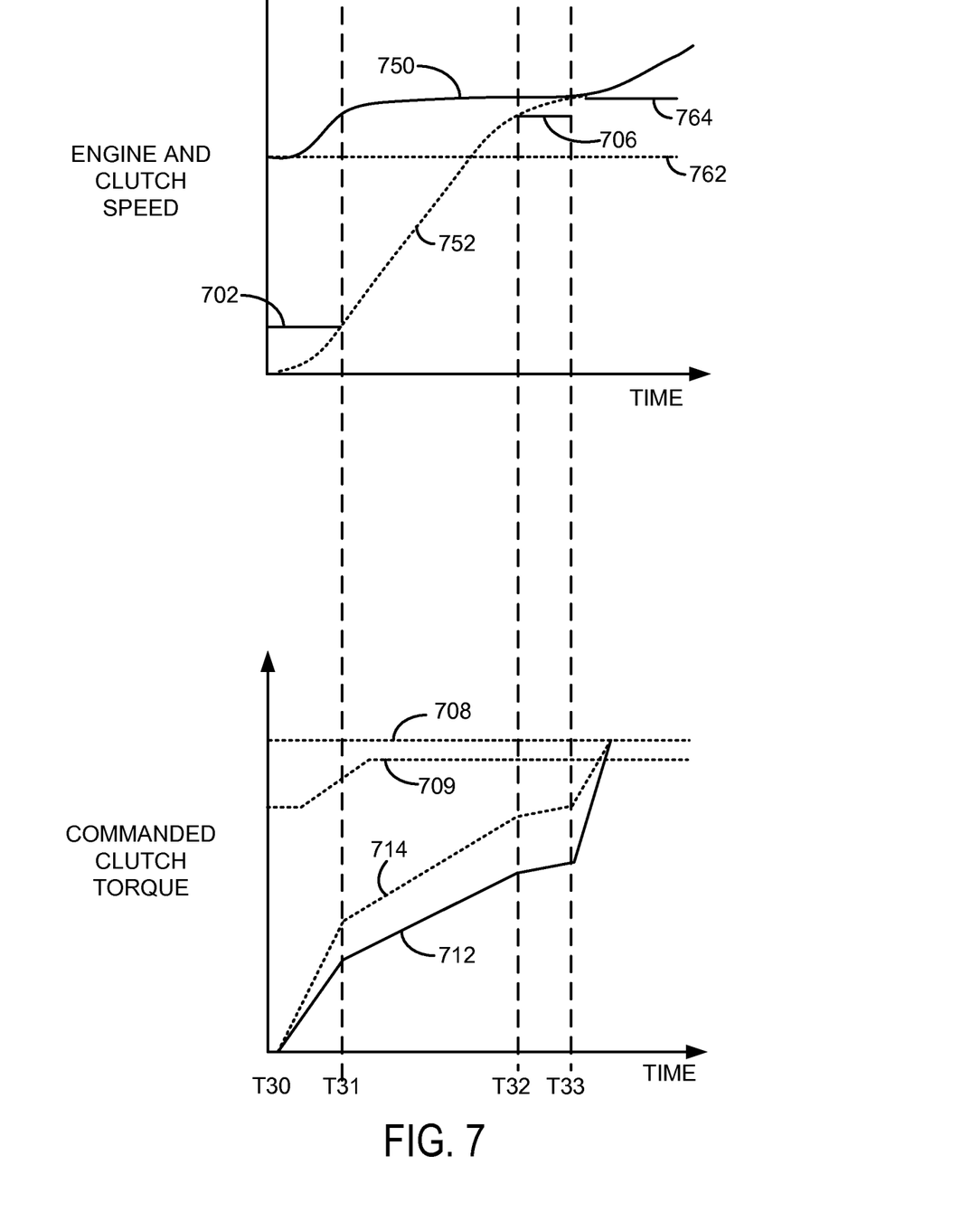
FIG. 7 shows a second example of engine and clutch speed with respect to command clutch torque capacity.

Referring now to FIG. 7, a fourth example sequence for launching a vehicle that includes a manual transmission with a clutch actuator is shown. The sequence shown in FIG. 7 may be provided via the method of FIG. 8 in the system of FIGS. 1 and 2. The sequence of FIG. 7 is representative of a vehicle launch where the driver does not operate a clutch pedal after a vehicle is stopped while the vehicle's engine continues to rotate and combust air and fuel and where maximum engine torque is less than maximum clutch torque capacity. The maximum engine torque capacity may be less than maximum clutch torque capacity if the vehicle is being launched (e.g., accelerated from zero speed) with the transmission engaged in a gear higher than $1^{st}$ gear (e.g., $2^{nd}$ gear). Further, the maximum engine torque may be limited due to pre-ignition, low combustion stability, and/or knock. The clutch is opened by the clutch actuator when the vehicle is stopped. The vehicle may be automatically stopped in response to a driver applying a brake and driver demand torque less than a threshold.

The first plot from the top of FIG. 7 is a plot of engine speed and clutch speed versus time. The vertical axis represents engine speed and clutch speed and speed increases in the direction of the vertical axis arrow. The horizontal axis represents time and time increases from the left side of the plot to the right side of the plot. Solid line curve 750 represents engine speed. Dashed line curve 752 represents clutch output speed (e.g., speed on an opposite side of the clutch than the side of the clutch the engine is on). Clutch speed at the level of line 602 is a minimum clutch output speed. The difference between engine speed 750 and the clutch speed shown at 706 is a clutch slip threshold.

The second plot from the top of FIG. 7 is a plot of commanded clutch torque capacity versus time. The vertical axis represents clutch torque capacity (e.g., an amount of torque a clutch is capable of transferring) and clutch torque capacity increases in the direction of the vertical axis arrow. The horizontal axis represents time and time increases from the left side of the plot to the right side of the plot. Dashed line 708 represents a maximum clutch torque capacity. Dashed line 709 represents a maximum engine torque capacity at the present engine speed. Solid line 712 represents a commanded clutch torque capacity for a vehicle operated on a road with zero grade. Dashed line 709 represents a commanded clutch torque capacity for a vehicle operated on a road with a positive non-zero grade.

The first plot and the second plot are based on data from the same time. Additionally, the plots are time aligned to show the relationships between variables.

At time T30, the engine is operating at idle speed and the driver releases a brake pedal or other condition (not shown). The commanded clutch torque capacity is increased at a first rate in response to the brake pedal being released and clutch output speed being less than a minimum clutch output speed. The clutch output speed begins to increase in response to the increased commanded clutch torque capacity. Shortly after time T30, engine speed is increased to increase the engine's maximum torque.

At time T31, the commanded clutch torque capacity is increased at a second rate, lower than the first rate, in response to clutch speed being greater than a minimum clutch output speed threshold. The clutch output speed continues to increase in response to the increased commanded clutch torque capacity and engine speed.

At time T32, the commanded clutch torque capacity is increased at a third rate, lower than the second rate, in response to clutch slip being less than a threshold. Clutch slip is a speed difference between engine speed (e.g., 750) and clutch output speed (e.g., 752). The clutch slip threshold is the distance from line 706 to engine speed 750. The clutch output speed continues to increase in response to the commanded clutch capacity and engine speed.

At time T33, the commanded clutch torque capacity is increased at a maximum rate in response to clutch slip speed being zero. By rapidly increasing the commanded clutch torque capacity, clutch slip may be avoided, even if engine torque increases.

Thus, to launch the vehicle on a road with a non-zero positive grade, engine speed may be increased without a driver touching an accelerator pedal via adjusting an engine torque actuator in response to releasing the vehicle's brake pedal. In this way, the possibility of stalling the engine may be reduced.

Figure 8:
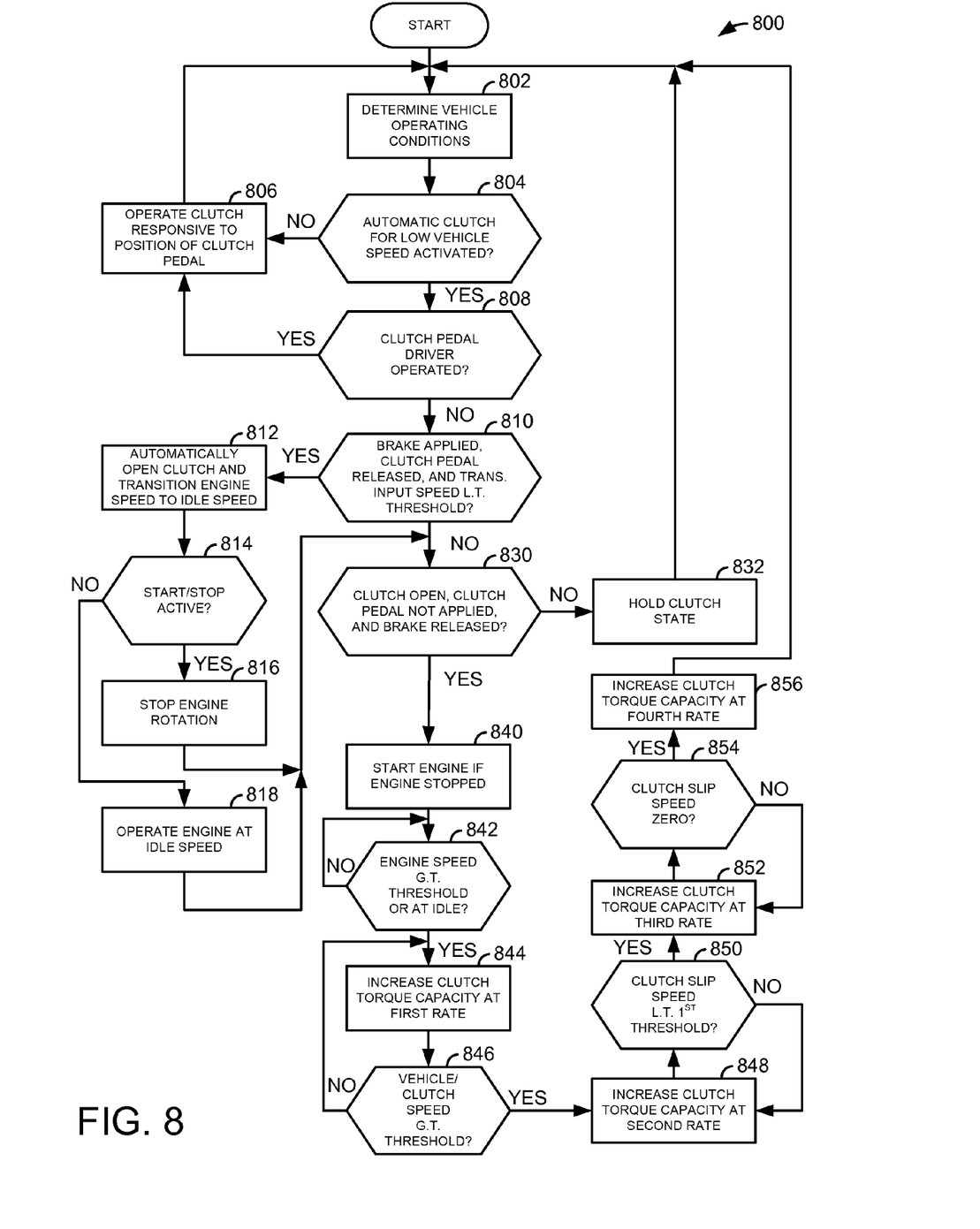
FIG. 8 is a flowchart of an example method for operating a clutch of a manual transmission.

Referring now to FIG. 8, a method for operating a vehicle is shown. The method of FIG. 8 may be at least partially implemented as executable instructions stored in non-transitory controller memory. The method of FIG. 8 may cooperate with and be a part of the system of FIGS. 1 and 2. At least portions of the method of FIG. 8 may be actions taken in the physical world to transform operating conditions of a vehicle. Further, the method of FIG. 8 along with the system of FIGS. 1 and 2 may provide the clutch sequences shown in FIGS. 4-7.

At 802, method 800 determines vehicle operating conditions. Vehicle operating conditions may be determined via data input to a controller from vehicle sensors and actuators. Vehicle operating conditions may include but are not limited to engine speed, vehicle speed, presently selected gear, accelerator pedal position, clutch pedal position, road grade via an inclinometer, and brake pedal position. Method 800 proceeds to 804 after vehicle operating conditions are determined.

At 804, method 400 judges if the manual transmission's clutch is activated for automatic operation (e.g., operated without input from the driver operated clutch pedal). In one example, method 800 may judge that manual transmission clutch may be automatically operated for low vehicle speeds when a driver selects automatic operation of the manual transmission clutch via a machine/human interface. If method 800 judges that automatic operation of the manual transmission is to be performed at low vehicle speeds (e.g., less than 10 KPH), the answer is yes and method 800 proceeds to 808. Otherwise, the answer is no and method 800 proceeds to 806.

At 806, method 800 operates the manual transmission clutch according to a position of a driver operated clutch pedal. In particular, a clutch actuator adjusts a position of bearing that moves longitudinally along an axis of the transmission input shaft. The actuator changes the bearing's position in response to a position of a manually operated clutch pedal. If the clutch pedal is fully depressed, the clutch is opened via the actuator. If the clutch pedal is fully released, the clutch is closed via the actuator. If the clutch pedal is partially depressed, the clutch is closed to provide a clutch torque capacity that varies with the clutch pedal position. For example, the clutch capacity may be increased as the clutch pedal approaches a base position where the clutch pedal is fully released. Method 800 returns to 802 after operating the manual transmission clutch via the clutch actuator based clutch pedal position.

At 808, method 800 judges if the clutch pedal is being operated by the driver. Method may judge that the clutch pedal is being operated by a driver based on clutch pedal position. For example, if the clutch pedal position is other than a release position, method 800 judges that the driver is operating the clutch pedal. The answer is yes if the driver is operating the clutch pedal and method 800 proceeds to 806. Thus, if the driver applies the clutch pedal when automatic clutch operation is enabled for low vehicle speeds, the clutch actuator follows the clutch pedal position. In this way, the driver may be assigned higher priority over clutch operation. The answer is no if method 800 judges that the driver is not operating the clutch pedal and method 800 proceeds to 810.

At 810, method 800 judges if the vehicle brake pedal is applied, the clutch pedal is released, and transmission input shaft speed is less than a threshold or if engine speed is less than a threshold. If so, the answer is yes and method 800 proceeds to 812. Otherwise, the answer is no and method 800 proceeds to 830. An applied brake pedal, released clutch pedal, and vehicle speed less than a threshold may be conditions for automatically opening the manual transmission clutch via the clutch actuator. However, additional or fewer conditions may also be the basis for opening the manual transmission clutch.

At 812, method 800 automatically opens the manual transmission clutch via the manual transmission clutch actuator and engine speed is transitioned to idle speed. The driver does not apply or release the clutch pedal when the clutch is automatically operated. Method 800 proceeds 814 after the manual transmission clutch is opened.

At 814, method 800 judges if automatic engine stop/start is activated. Automatic engine start/stop is the automatic stopping and starting of the vehicle's engine without the driver operating a dedicated start/stop input device that has a sole purpose of starting and/or stopping the engine. The engine may be automatically stopped via the controller judging that select conditions are present for stopping the engine. In one example, the driver may activate or deactivate start/stop functionality via machine/human interface. If method 800 judges that automatic engine start/stop is activated, the answer is yes and method 800 proceeds to 816. Otherwise, the answer is no and method 800 proceeds to 818.

At 816, method 800 stops engine rotation and combustion in the engine via stopping fuel flow and spark. Method 800 proceeds to 830 after fuel and spark are not supplied to the engine cylinders.

At 818, method 800 operates the engine at a predetermined idle speed and continues to combust air and fuel in engine cylinders. Method 800 proceeds to 830 after the engine speed is adjusted to idle speed.

At 830, method 800 judges if the manual transmission clutch is open, the clutch pedal is not depressed or applied, and the brake pedal is released. Additionally, in some examples, other operating conditions may also be considered. If method 800 judges that the conditions are present, the answer is yes and method 800 proceeds to 840. Otherwise, the answer is no and method 800 proceeds to 832.

At 832, method 800 holds the manual clutch in its present operating state. For example, if the manual transmission clutch is closed, it remains closed. Method 800 returns to 802 after the clutch state is held.

At 840, method 800 starts the engine if the engine is not operating and combusting air and fuel. The engine is started by cranking the engine and supplying the engine with spark and fuel. The engine idle speed may also be increased to increase the engine's torque capacity at 840 in response to a maximum engine torque being less than a threshold torque (e.g., a predetermined value or a maximum clutch torque capacity). Method 800 proceeds to 842 after the engine is started.

At 842, method 800 judges if the engine speed is greater than (G.T.) a threshold engine speed or an idle speed. In one example, the threshold speed is greater than engine cranking speed and less than engine idle speed. If method 800 judge that engine speed is greater that the threshold speed or idle speed, the answer is yes and method 800 proceeds to 844. Otherwise, the answer is no and method 800 returns to 842.

At 844, method 800 increases the manual transmission's clutch torque capacity. The clutch torque capacity may be increased via at least partially releasing the clutch (opening) or decreasing a difference between an input side speed of the clutch and an output side speed of the clutch. The manual transmission clutch torque capacity may be increased at a first rate (e.g., 20 N-m/second) in response to engine speed exceeding the threshold speed or being at idle speed. The rate and magnitude that the clutch capacity is increased may also be adjusted in response to road grade via the following equation: $Tgrade=R_rMg \sin(\theta)$ as discussed above. Likewise, the clutch torque capacity adjustments at 848 and 852 may also be adjusted responsive to road grade. The rate of increase in clutch torque capacity may also be adjusted based on the transmission gear that is selected (e.g., the rate of clutch torque capacity is decreased as the selected gear increases, rate of increase for second gear is less than rate of increase for first gear). Further, the clutch torque capacity rate of increase may be adjusted so that clutch torque capacity is less than maximum engine torque at the present operating speed to reduce the possibility of engine stall. Method 800 proceeds to 846 after the clutch torque capacity is increased at the first rate.

At 846, method 800 judges if vehicle speed has exceeded a threshold speed or if speed of the output side of the clutch has exceeded a threshold speed. If so, the answer is yes and method 800 proceeds to 848. Otherwise, the answer is no and method 800 returns to 844.

At 848, method 800 increases the manual transmission's clutch torque capacity at a second rate (e.g., 15 N-m/second). The clutch torque capacity may be increased via at least partially releasing the clutch or decreasing a difference between an input side speed of the clutch and an output side speed of the clutch. The manual transmission clutch torque capacity may be increased at a second rate in response to vehicle speed exceeding the threshold or clutch output speed exceeding a threshold speed. Method 800 proceeds to 850 after the clutch torque capacity is increased at the second rate.

At 850, method 800 judges if the manual transmission clutch slip speed (e.g., difference in clutch input speed and output speed) is less than a $1^{st}$ threshold. If so, the answer is yes and method 800 proceeds to 852. Otherwise, the answer is no and method 800 returns to 848. Alternatively, if maximum engine torque is less than a first threshold level, method 800 may judge if manual transmission clutch torque capacity is within a predetermined torque (e.g., a second threshold) of the maximum engine torque, the answer is yes and method 800 proceeds to 852. Otherwise, method 800 returns to 848. In this way, method 800 may adjust the manual clutch torque capacity based on being within a threshold torque of a maximum engine torque or in response to a clutch slip being less than a threshold value.

At 852, method 800 increases the manual transmission's clutch torque capacity at a third rate (e.g., 10 N-m/second). The clutch torque capacity may be increased via at least partially releasing the clutch or decreasing a difference between an input side speed of the clutch and an output side speed of the clutch. The manual transmission clutch torque capacity may be increased at the third rate in response to clutch slip speed being less than a threshold. Method 800 proceeds to 854 after the clutch torque capacity is increased at the third rate.

At 854, method 800 judges if the manual transmission clutch slip speed (e.g., difference in clutch input speed and output speed) is less than a $2^{nd}$ threshold or substantially zero (e.g., less than 20 RPM). If so, the answer is yes, and method 800 proceeds to 856. Otherwise, the answer is no and method 800 returns to 852.

At 856, method 800 increases the manual transmission's clutch torque capacity at a third rate (e.g., 35 N-m/second). The clutch torque capacity may be increased via at least partially releasing the clutch or decreasing a difference between an input side speed of the clutch and an output side speed of the clutch. The manual transmission clutch torque capacity may be increased at the fourth rate in response to clutch slip speed being less than a threshold or substantially zero. Method 800 returns to 802 after the clutch torque capacity is increased at the fourth rate. In this way, the manual transmission clutch may be operated to reduce the possibility of engine stalling and to launch a vehicle that has been stopped without the driver applying or operating the clutch pedal.

Thus, the method of FIG. 8 provides for a method for operating a vehicle, comprising: automatically opening a clutch of a manual transmission in response to a clutch pedal for operating the clutch not being applied and a speed being less than a threshold while the manual transmission is engaged in a gear, in a first operating mode; and opening the clutch in response to a driver applying the clutch pedal in a second operating mode. The method includes where the speed is a vehicle speed, and where the clutch is the only clutch of the manual transmission. The method includes where clutch is automatically opened via an electrical clutch actuator.

In some examples, the method further comprises automatically stopping an engine without a driver requesting an engine stop via a dedicated engine stop/start input. The method includes where the speed is an engine speed, and where the gear is first gear. The method further comprises automatically opening the clutch in response to a vehicle brake being applied, and further comprising automatically starting an engine in response to releasing the brake of the vehicle. The method includes where the clutch is positioned between an engine crankshaft and an input shaft of the manual transmission.

The method of FIG. 8 also provides for a method for operating a vehicle, comprising: automatically opening a clutch of a manual transmission in response to a clutch pedal for operating the clutch not being applied and a brake pedal being applied while the manual transmission is engaged in a gear; and automatically closing the clutch after automatically opening the clutch in response to the clutch pedal not being applied and a brake pedal being at least partially released. The method includes where the clutch begins automatically closing when a speed of an engine is greater than a minimum engine restart speed that is greater than an engine cranking speed, and where the brake pedal is at least partially released when it is traveling toward a base clutch pedal position. The method includes where engine cranking speed is a speed a motor rotates the engine, and further comprising increasing clutch torque capacity at a first rate when the clutch begins closing.

In some examples, the method further comprises increasing clutch torque capacity at a second rate in response to vehicle speed exceeding a threshold. The method further comprises increasing clutch torque capacity at a third rate in response to slip of the clutch being less than a threshold. The method further comprises increasing clutch torque capacity at a fourth rate in response to slip of the clutch being substantially zero.

As will be appreciated by one of ordinary skill in the art, method described in FIG. 8 may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
   automatically opening a clutch of a manual transmission in response to a clutch pedal for operating the clutch not being applied and a speed being less than a threshold while the manual transmission is engaged in a gear, in a first operating mode;
   opening the clutch in response to a driver applying the clutch pedal in a second operating mode; and
   automatically stopping an engine without the driver requesting an engine stop via a dedicated engine stop/start input.

2. The method of claim 1, where the speed is a vehicle speed, and where the clutch is the only clutch of the manual transmission.

3. The method of claim 1, where the clutch is automatically opened via an electrical clutch actuator.

4. A method for operating a vehicle, comprising:
   automatically opening a clutch of a manual transmission in response to a clutch pedal for operating the clutch not being applied and a speed being less than a threshold while the manual transmission is engaged in a gear, in a first operating mode; and
   opening the clutch in response to a driver applying the clutch pedal in a second operating mode, where the speed is an engine speed, and where the gear is first gear.

5. A method for operating a vehicle, comprising:
   automatically opening a clutch of a manual transmission in response to a clutch pedal for operating the clutch not being applied and a speed being less than a threshold while the manual transmission is engaged in a gear, in a first operating mode;
   opening the clutch in response to a driver applying the clutch pedal in a second operating mode; and
   automatically opening the clutch in response to a vehicle brake being applied, and further comprising automatically starting an engine in response to releasing the brake of the vehicle.

6. The method of claim 5, where the clutch is positioned between an engine crankshaft and an input shaft of the manual transmission.

7. A method for operating a vehicle, comprising:
   automatically opening a clutch of a manual transmission in response to a clutch pedal for operating the clutch not being applied and a brake pedal being applied while the manual transmission is engaged in a gear; and
   automatically closing the clutch after automatically opening the clutch in response to the clutch pedal not being applied and the brake pedal being at least partially released.

8. The method of claim 7, where the clutch begins automatically closing when a speed of an engine is greater than a minimum engine restart speed that is greater than an engine cranking speed, and where the brake pedal is at least partially released when it is traveling toward a base clutch pedal position.

9. The method of claim 8, where engine cranking speed is a speed a motor rotates the engine, and further comprising increasing clutch torque capacity at a first rate when the clutch begins closing.

10. The method of claim 9, further comprising increasing clutch torque capacity at a second rate in response to vehicle speed exceeding a threshold.

11. The method of claim 10, further comprising increasing clutch torque capacity at a third rate in response to slip of the clutch being less than a threshold.

12. The method of claim 11, further comprising increasing clutch torque capacity at a fourth rate in response to slip of the clutch being substantially zero.

13. A vehicle system, comprising:
   an engine;
   a manual transmission coupled to the engine, the manual transmission including a clutch that moves responsive to a clutch pedal; and
   a controller including executable instructions stored in non-transitory memory for automatically opening a clutch of the manual transmission in response to the clutch pedal not being applied and a speed being less than a threshold while the manual transmission is engaged in a gear, instructions to automatically start closing the clutch in response to a brake pedal being at least partially released, and further comprising additional instructions to increase a torque capacity of the engine via increasing engine speed in response to an estimate of clutch torque capacity to launch the vehicle.

14. The vehicle system of claim 13, where the brake pedal is at least partially released when the brake pedal moves closer to its base position, and where the base position is where the brake pedal reverts to when no force is applied to the brake pedal.

15. The vehicle system of claim 14, further comprising additional instructions to adjust a rate of increasing a torque capacity of the clutch in response to vehicle speed.

16. The vehicle system of claim 15, further comprising additional instructions to adjust the rate of increasing a torque capacity of the clutch in response to road grade.

17. The vehicle system of claim 14, where the engine torque capacity is increased via increasing engine speed.

18. The vehicle system of claim 13, further comprising an electrical clutch actuator, the electrical clutch actuator responsive to a position of the clutch pedal.

* * * * *